(12) United States Patent
Hallot et al.

(10) Patent No.: US 7,896,033 B2
(45) Date of Patent: Mar. 1, 2011

(54) DEVICE FOR THERMAL INSULATION OF AT LEAST A SUBMARINE PIPELINE COMPRISING A PHASE-CHANGE MATERIAL CONFINED IN JACKETS

(75) Inventors: Raymond Hallot, Martigues (FR); François Régis Pionetti, La Baleine (FR)

(73) Assignee: Saipem S.A., Montigny le Bretonneux (FR)

( * ) Notice: Subject to any disclaimer, the term of this patent is extended or adjusted under 35 U.S.C. 154(b) by 844 days.

(21) Appl. No.: 10/520,004

(22) PCT Filed: Jun. 18, 2003

(86) PCT No.: PCT/FR03/01869

§ 371 (c)(1), (2), (4) Date: Dec. 29, 2004

(87) PCT Pub. No.: WO2004/003424

PCT Pub. Date: Jan. 8, 2004

(65) Prior Publication Data

US 2005/0241717 A1    Nov. 3, 2005

(30) Foreign Application Priority Data

Jul. 1, 2002   (FR) .................................. 02 08179

(51) Int. Cl.
  *F16L 9/14*   (2006.01)
(52) U.S. Cl. ................. 138/149; 138/137; 138/141
(58) Field of Classification Search ............. 138/149, 138/141, 137
See application file for complete search history.

(56) References Cited

U.S. PATENT DOCUMENTS

| | | | | |
|---|---|---|---|---|
| 2,576,698 A | * | 11/1951 | Russum | 428/75 |
| 3,698,440 A | * | 10/1972 | Matthieu et al. | 138/149 |
| 3,768,547 A | * | 10/1973 | Best | 165/45 |
| 3,812,886 A | * | 5/1974 | Hallwood | 138/149 |
| 4,162,093 A | * | 7/1979 | Sigmund | 285/47 |
| 4,194,536 A | * | 3/1980 | Stine et al. | 138/149 |
| 4,250,958 A | * | 2/1981 | Wasserman | 165/46 |
| 5,020,481 A | * | 6/1991 | Nelson | 122/494 |
| 5,654,060 A | * | 8/1997 | Holman et al. | 428/68 |

(Continued)

FOREIGN PATENT DOCUMENTS

| | | |
|---|---|---|
| FR | 2788 831 | 1/1999 |
| WO | WO 00/40886 | 7/2000 |

OTHER PUBLICATIONS

US 6,513,577, 02/2003, Baylot et al. (withdrawn)

*Primary Examiner*—James F Hook
(74) *Attorney, Agent, or Firm*—Cohen Pontani Lieberman & Pavane LLP

(57) ABSTRACT

A device for thermally insulating at least one undersea pipe. The device comprises a thermally insulating covering surrounding the pipe, the covering being covered by an outer leak proof protective case, and the case being made of a flexible or semi rigid material suitable for remaining in contact with the outside surface of the insulating covering when it deforms. The device is characterized in that the insulating covering comprises a phase-change material confined in at least one container made of a flexible or semi rigid material that is deformable, and the container is disposed around the pipe.

28 Claims, 10 Drawing Sheets

U.S. PATENT DOCUMENTS

| | | |
|---|---|---|
| 6,000,438 A | 12/1999 | Ohrn |
| 6,099,894 A * | 8/2000 | Holman .................... 427/126.3 |
| 6,116,290 A * | 9/2000 | Ohrn et al. .................. 138/149 |
| 6,213,157 B1 * | 4/2001 | Thiebaud et al. ............ 138/149 |
| 6,382,259 B1 * | 5/2002 | Codling ..................... 138/149 |
| 6,412,545 B1 * | 7/2002 | Buff et al. ..................... 165/10 |
| 6,415,868 B1 * | 7/2002 | Janoff et al. ................ 166/368 |
| 6,645,598 B2 * | 11/2003 | Alderman .................... 428/69 |
| 6,703,127 B2 * | 3/2004 | Davis et al. ............... 428/402.2 |
| 6,978,825 B1 * | 12/2005 | Baylot et al. .................. 165/45 |
| 7,069,957 B2 * | 7/2006 | Hallot et al. ................ 138/149 |
| 7,367,398 B2 * | 5/2008 | Chiesa et al. ............... 166/302 |
| 2004/0231355 A1 * | 11/2004 | Mayer ......................... 62/371 |
| 2006/0196568 A1 * | 9/2006 | Leeser et al. ................ 138/149 |

* cited by examiner

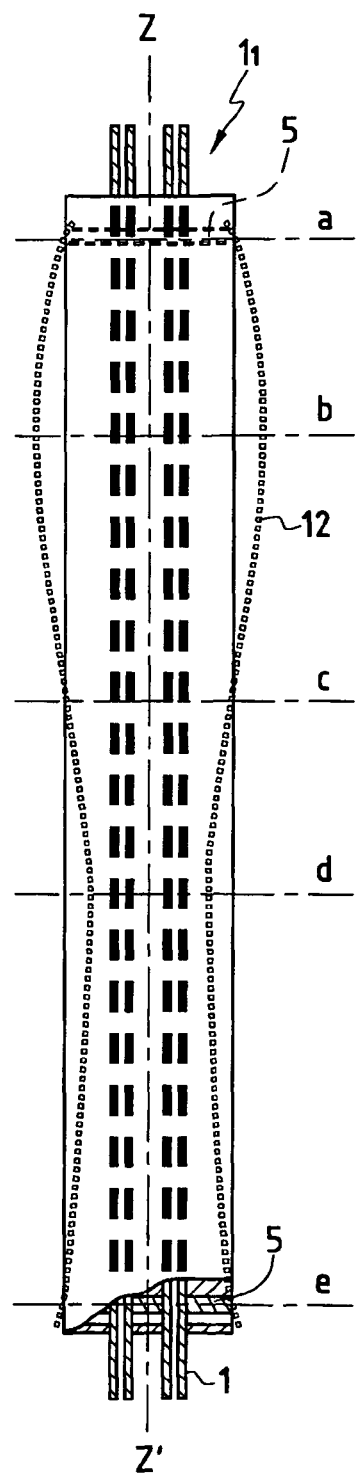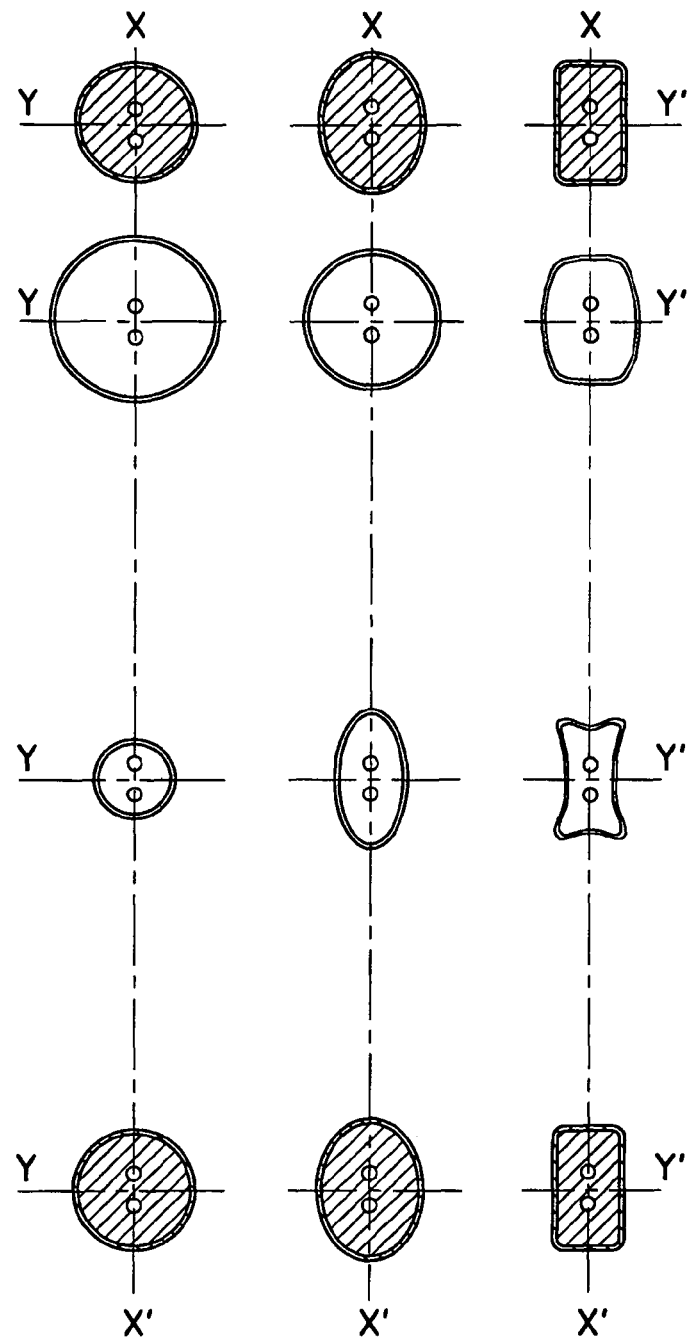
FIG.6  FIG.7  FIG.8  FIG.9

DEVICE FOR THERMAL INSULATION OF AT LEAST A SUBMARINE PIPELINE COMPRISING A PHASE-CHANGE MATERIAL CONFINED IN JACKETS

PRIORITY CLAIM

This is a U.S. national stage of application No. PCT/FR03/001869, filed on 18 Jun. 2003. Priority is claimed on the following application(s): Country: France, Application No.: 02/08179, Filed: 1 Jul. 2002; the content of which is incorporated here by reference.

BACKGROUND OF THE INVENTION

1. Field of the Invention

The present invention relates to devices and method of thermally insulating at least one undersea pipe resting on the sea bottom, in particular at great depths, for connecting the sea bottom to anchored installations floating on the surface.

The invention relates more particularly to pipes connecting the sea bottom to anchored installations floating on the surface.

The technical field of the invention is that of making and assembling insulating systems outside and around pipes for conveying hot effluents from which it is desired to limit losses of heat.

The invention applies more particularly to developing oil fields in deep seas, that is to say offshore oil installations where surface equipment is generally situated on floating structures while the wellheads are at the bottom of the sea. The pipes concerned by the present invention are more particularly risers, i.e. pipes providing a bottom-to-surface connection by rising towards the surface, however the invention also applies to pipes connecting wellheads to said riser pipes.

Present developments in deep seas are generally performed in depths of water that can be as great as 1500 meters (m). Future developments are anticipated in depths of water of as much as 3000 m to 4000 m, and even more.

2. Discussion of Related Art

The main application of the invention is thermally insulating underwater, sub-sea, or immersed pipes or ducts, and more particularly those at great depths, more than 300 m, serving to convey hot petroleum products which will lead to difficulties if they cool excessively, whether under normal production conditions or in the event of production being stopped.

In that type of application, numerous problems arise if the temperature of the petroleum products decreases by a significant amount compared with their production temperature, which production temperature is generally in the range 60° C. to 80° C., or even higher, while the temperature of the surrounding water, particularly at great depths, can be well below 10° C., and can be as little as 4° C. If the petroleum products cool to below a certain temperature $T_1$, which depends on the quality of the products concerned, where the temperature $T_1$ generally lies in the range 20° C. to 60° C., for example, then the following are observed:

a great increase in viscosity, which reduces the flow rate in the pipe;

a precipitation of dissolved paraffin which then increases the viscosity of the product, and by being deposited can reduce the effective inside diameter of the pipe;

flocculation of asphaltenes, leading to the same problems; and the sudden, compact, and massive formation of gas hydrates which precipitate at high pressure and low temperature, thus suddenly obstructing the pipe.

Paraffins and asphaltenes remain stuck to the wall which must then be cleaned by scraping the inside of the pipe; in contrast hydrates are even more difficult and sometimes even impossible to resorb.

One of the functions of thermally insulating such pipes is thus to slow down the cooling of the petroleum effluent conveyed so that its temperature does not drop below $T_1$, e.g. 40° C. on reaching the surface, for a production temperature at the inlet of the pipe of $T_2=60°$ C. to 80° C., not only under steady production conditions, but also in the event of the rate of production decreasing or even stopping, in order to ensure that the temperature of the effluent does not drop too far below the temperature $T_1$, e.g. below 30° C., in order to limit the above-mentioned problems, or at least to ensure that they remain reversible.

With the installation of single pipes or of bundles of pipes, it is generally preferred to prefabricate the pipes on land in unit lengths of 250 m to 500 m, which lengths are then towed offshore by a tug. For a tower type bottom-to-surface connection, the length of the pipe generally constitutes 50% to 95% the depth of the water, i.e. it can be as much as 2400 m for a depth of 2500 m. While it is being built on land, the first unit length is pulled out to sea and the following length is connected to its end, the tug keeping the assembly under traction throughout the end-to-end joining stage which can last for several hours, or even several days. Once the entire pipe or bundle of pipes is in the water, it is towed to the site, generally below the surface in a substantially horizontal configuration, where it is then "up-ended", i.e. tilted vertically so as to reach the vertical position, after which it is put in its final position.

A device for thermally insulating at least one undersea pipe is known that comprises an insulating outer covering surrounding the pipe, and an outer protective case, said outer case performing two functions:

firstly preventing damage which could arise during manufacture and towing, and also during laying, particularly in shallow zones, where towing can under some circumstances take place over distances of several hundred kilometers; for this purpose, the materials used are quite strong, such as steel, a thermoplastic or thermosetting compound, or indeed a composite material; and secondly creating a leakproof confinement around the insulating system; this confinement is necessary with insulating outer coverings constituted by materials that can be subject to migration, or indeed that include fluid compounds.

In depths of 2000 m, hydrostatic pressure is about 200 bars, i.e. 20 megapascals (MPa), which implies that the set of pipes and their covering of insulating material must be capable of withstanding not only such pressures without damage during pressurization and depressurization of the pipe in which the hot fluid flows, but must also be capable of withstanding temperature cycles that lead to changes in the volumes of the various components, and thus to positive or negative pressures that can lead to partial or total destruction of the case, either by exceeding acceptable stresses, or by implosion of the outer case (pressure variants leading to negative internal pressures).

Document WO 00/40886 discloses an insulating device in which a solid-liquid insulating phase-change material is used having a latent heat of fusion with a phase change that takes place at a temperature $T_0$ that is higher than the temperature $T_1$ at which the petroleum flowing inside the pipe becomes too viscous, where the temperature $T_1$ generally lies in the range 20° C. to 60° C. and is lower than the temperature $T_2$ of the crude oil penetrating into the pipe.

In the event of production stopping, a phase-change material (PCM) makes it possible to conserve the fluid that would normally be flowing inside the inner pipe at a temperature that is high enough to avoid paraffins or hydrates forming in the petroleum product.

Thus, in the event of production stopping, the crude oil ceases to flow and remains in position within the pipe, and the loss of heat to the external environment, generally at 4° C. in very great depths, takes place to the detriment of the PCM, the crude oil continuing to remain at a temperature that is greater than or substantially equal to the phase change temperature of said PCM.

Throughout the solidification or crystallization of the PCM, the temperature of the PCM remains substantially constant and equal to $T_0$, e.g. 36° C., and thus the inner pipe containing the crude oil remains at a temperature that is greater than or substantially equal to the temperature ($T_0$) of the PCM, i.e. 36° C., thus preventing paraffins or hydrates forming in the crude oil.

Said insulating phase-change material is preferably selected for its low thermal conductivity, and in particular conductivity of less than 0.5 watts per meter per degree Celsius (W/m/K).

Said PCM insulating material is selected in particular from materials constituted by at least 90% chemical compounds selected from alkanes, in particular having a hydrocarbon chain of at least 10 carbon atoms, or indeed optionally hydrated salts, glycols, bitumens, tars, waxes, and other fatty materials that are solid at ambient temperature, such as tallow, margarine, or fatty alcohols and acids, and preferably the incompressible material is constituted by paraffin having a hydrocarbon chain of at least 14 carbon atoms.

The phase-change materials described in the past generally present significant change in volume on changing state, this change in volume possibly being as much as 20% for paraffins. The outer protective case must be capable of accommodating such variations in volume without damage.

That is why, according to WO 00/40886, the insulating phase-change material is confined within a leakproof and deformable case that is thus capable of following the expansion and the contraction of the various components under the influence of all of the surrounding parameters, and in particular internal and external temperatures. The pipe is thus confined within a semirigid or flexible thermoplastic case, in particular one made of polyethylene or polypropylene, and one that is circularly shaped, for example, with any increase or reduction in its inside volume due to temperature variations being comparable to breathing and being absorbed by the flexibility of the case which is constituted, for example, by a thermoplastic material presenting a high elastic limit. However, in order to withstand mechanical stresses, it is preferable to use a case that is semirigid, being made of a strong material such as steel or a composite material, for example a compound based on a binder such as epoxy resin and organic or inorganic fibers such as glass fibers or carbon fibers, but under such circumstances the case is given an oval or flattened shape with or without reentrant portions so as to give it a section that for given perimeter is less than that of the corresponding circle. Thus, the "breathing" of the bundle will lead, in the event of an increase and a decrease in volume, respectively to the case being made rounder and to the case being made flatter. Under such circumstances, the case and bundle assembly is referred to as a "flat bundle" in contrast to a circular case.

In WO 00/40886, the PCM is absorbed within an absorbent matrix, and it occupies all of the space that exists between the pipe and said outer case with which it always remains in contact, said case being deformable.

While an insulating device of that invention is being made, which preferably takes place on land, the space between the pipe(s) and the outer case is filled with the PCM while in the liquid state, i.e. while hot. Nevertheless, there is a risk during filling with said PCM that said PCM might solidify locally, thus preventing the volume from being filled completely. Under such circumstances, empty zones or gas pockets are created that are harmful firstly to the insulating effect during future operation of the installation, and secondly and above all to overall strength since there is a risk of the case collapsing locally when the pipe is installed in great depths, i.e. when it is subjected to very high hydrostatic pressures. These problems are easily overcome on short lengths of pipe, for example 6 m or 12 m, but they are much more difficult to avoid over significant lengths, for example more than 100 m.

In order to overcome those drawbacks, techniques have been developed in the prior art that are based on insulating devices comprising an insulating material constituted by a gel that presents a high degree of insulation. Gelling presents the advantage of avoiding convection phenomena within the insulating mass. In addition, the gel is generally obtained by physical, chemical, or physico-chemical reactions between various components, thus enabling the gel to be injected in liquid form immediately after its components have been mixed together, it being possible to fill the case completely before bulk gelling begins in significant manner.

Embodiments have thus been proposed in which the insulating PCM is formulated in the form of particles or microcapsules of said PCM that are uniformly dispersed within a matrix of a primary insulating material, in particular an insulating gel in order to make it easier to occupy the entire space between the pipe and the outer case.

Nevertheless, that technique presents the drawback of the quantity of PCM surrounding the pipe being necessarily reduced since it is distributed discontinuously around the pipe.

In addition, the inventors have found that it is only the PCM that is close to the hot pipe that can accumulate heat on liquefying, since the PCM close to the outer case is generally at the temperature of the sea bottom, i.e. 4° C., and thus does not contribute to the process of accumulating heat, i.e. it remains permanently in the solid or crystallized state. This fraction of the PCM close to the outer case is thus ineffective and useless and can even be harmful if the PCM used presents high intrinsic conductivity, as is the case for metallic salts.

Prior embodiments have also been described for applications in which the pipe rests horizontally on the sea bottom. However certain problems then arise for bottom-to-surface connections.

With a bottom-to-surface connection, for example the vertical portion of a tower, or indeed a catenary section connecting the top of the tower to a support on the surface, or also with pipes resting on a deep slope on the sea bottom, the external pressure varies along the pipe, decreasing on rising towards the surface. With insulating materials that are in paste or fluid form, such as PCMs, the material presents density that is less than that of sea water, generally having a relative density lying in the range 0.8 to 0.85, so a pressure differential between the inside and the outside will vary along said pipe, increasing on approaching the surface. Thus, greatest deformation occurs in the portions that present the greatest pressure differential, thereby leading to important transfers of fluid parallel to the longitudinal axis of said pipe. In addition, such transfers are amplified by the "breathing" phenomena due to temperature variations, as described above.

A "flat bundle" is sensitive to pressure variations due to slopes: higher pressure lower down, lower pressure higher up, and the towing stage is critical since the length of the bundle can be as much as several kilometers, and the bundle is never accurately horizontal, giving rise to significant pressure variations during said towing, and above all during the up-ending operation for a bottom-to-surface connection.

When the bundle is in the vertical position or on the sea bottom on a significant slope, the pressure differential created by the low density of the insulating material, associated with the variation in volume created by the thermal expansion of the insulating material, leads to movements in the insulating material that the outer case must be capable of withstanding. It is desirable to avoid particles moving parallel to the axis of the bundle, i.e. migration of insulating material between two remote zones of the bundle, since that runs the risk of destroying the physical structure proper of the insulating material.

In order to ensure that the bundle behaves well throughout its lifetime, it is desirable for it not to contain any residual gas. With an insulating mixture that is pasty or semifluid, any pocket of gas that results from the manufacturing process will have repercussions, firstly during transport since once the bundle is being towed at significant depth, the ambient pressure will compress the residual gas, which runs the risk of significantly reducing its buoyancy and can lead to situations that are dangerous not only for the equipment but also for personnel; and secondly, while it is being put into a vertical position, any pockets of compressed gas will tend to come together towards the top of the bundle, thus running the risk of creating a significant length of pipe that does not have any insulating compound.

OBJECTS AND SUMMARY OF THE INVENTION

A first object of the present invention is thus to provide a device for thermally insulating at least one undersea pipe including a phase-change material, preferably an insulating phase-change material that satisfies the following targets:

a) the insulating device is easy to manufacture, in particular in terms of filling said insulating phase-change material in such a manner that eliminates, or at least reduces, any risk of creating voids or pockets of gas in the volume to be filled between the pipe and the outer case; and b) the phase-change material is localized and distributed around the pipe and in the vicinity of the pipe rather than in the vicinity of the case, so as to improve its effectiveness.

Another object of the present invention is to provide a system for insulating a pipe that includes a covering of PCM of semifluid or pasty type that can be put into place around the pipe, on land, more simply and at lower cost, in such a manner as to ensure that the pipe can be towed under the surface and up-ended into a vertical position in order to be installed, while ensuring that the entire assembly remains undamaged until it is put into production and throughout its working lifetime, which generally exceeds 30 years.

Another object is to be able to insulate at least one undersea pipe for bottom-to-surface connection or for laying on the bottom, in particular at great depth, and in particular in a steeply sloping zone, that is capable of providing significant transverse flexibility in order to absorb variations in the volume of the insulating PCM contained in an outer case surrounding the pipe, while nevertheless conserving sufficient longitudinal rigidity to make handling possible, both during manufacture on land, and during towing to the site, and for conserving mechanical integrity of said case throughout the lifetime of the pipe, which can exceed 30 years.

One problem posed is thus to minimize longitudinal migration of insulating materials subject to migration and contained inside said case, with this being particularly significant when said insulating material is semifluid or pasty, and in particular of the type comprising a gelled insulating matrix, given the risk of the performance of the insulating mixture deteriorating in the event of excess internal shear being applied to said insulating matrix.

In addition, another problem is to create a system for insulating an undersea pipe or a bundle of pipes organized as a "flat" bundle containing a phase-change material, preferably an insulating PCM, and having phase behavior on restarting that is such that restarting can be performed in controllable time, and in particular in time that is shorter than has been possible in the prior art.

In the event of a stoppage lasting several days or even several weeks, while the PCM is still active, precautions are generally taken to purge the line by causing a substitute substance to flow in a loop, e.g. gas oil, so as to keep the assembly in a safe condition prior to allowing the temperature of the pipe to drop down to 4° C. Thereafter, on restarting, it is general practice to use the same gas oil so as to reheat the pipe by causing it to flow in a loop from the floating support where it is heated by being passed through boilers or through heat exchangers that recycle heat taken from gas turbines.

Thus, during heating, heat migrates from the inside of the pipe towards the outer surrounding medium which is generally at 4° C., and throughout the heating stage, the major fraction of the heat conveyed by the circulating gas oil is absorbed by the PCM so as to reliquefy it, with this stage possibly lasting several days or even several weeks if the pipe is very long, or if the amount of heat generated on the floating support is not sufficient. It is only after this stage of heating the pipe by circulating gas oil that it is possible to reconnect the wellheads and restart production.

If production is restarted prematurely, the PCM will only be partially liquid and its internal temperature will be less than or equal to $T_0$ (the phase change temperature), and thus low over the undersea pipe as a whole, in which case the following phenomena can be observed.

As the petroleum leaving the well at high temperature, e.g. 75° C. advances towards the floating production storage and off-loading (FPSO) unit, it delivers heat to the PCM for liquefying it, and as a result the temperature of the petroleum drops quickly since the PCM then acts not as an insulating system but inversely as an absorber of heat, thus leading to accelerated cooling of the crude oil. As a result, after traveling a few kilometers, or even after traveling only a few hundreds of meters, the temperature of the oil drops below the critical value $T_1$ at which the unwanted phenomena of hydrate or paraffin plug formation occur within the oil flowing along the pipe, and that can lead to the stream of crude oil being blocked. In the zone close to the wellhead, the PCM will reliquefy progressively and the reliquefication front will advance slowly towards the FPSO. In a more remote zone, the temperature will remain stable at around $T_0$ and liquefication cannot continue unless the crude oil is still at a temperature higher than $T_0$.

Thus, with very long lines, e.g. 5 km or 6 km long, in a zone that is very far from the hot source, i.e. close to the FPSO, there will not be enough heat delivered and the PCM will lose heat to the ambient medium at 4° C. To provide this heat, it will change progressively to the solid state.

Thus, particularly for very long pipes, it can be seen that when restarting the PCM in the zone close to the wellheads can be in a reliquefication stage, whereas at the other end, close to the FPSO, the PCM is in a resolidification stage, since the rate at which heat is being lost to the ambient medium is greater than the rate at which heat is being supplied by the crude oil flowing in the pipe. The PCM is waiting for a hot front of crude oil to transform it back into the liquid phase.

Finally, a last object of the present invention is thus to provide a system for insulating a pipe, the system comprising an insulating phase-change medium which does not absorb heat too quickly from the hot fluid flowing in the pipe during a restarting stage, thus making it possible to lengthen the period during which the temperature of the fluid flowing in an undersea pipe can be maintained above a fixed value, such that the length of time required for heating by means of a substitution substance circulating in a loop, after a prolonged stoppage is shortened and thus ensuring that the duration of the restarting stage is shortened, so that, for example, it can suffice to heat the pipe in part only without it being necessary to wait for all of the PCM to be completed liquefied.

To do this, the present invention provides a device for thermally insulating at least one undersea pipe, the device comprising:

a thermally insulating covering surrounding said pipe(s);
said covering itself being covered by an outer leakproof protective case, and said case being made of a flexible or semirigid material suitable for remaining in contact with the outside surface of said insulating covering when it deforms,
the device being characterized in that:
said insulating covering comprises a phase-change material, preferably an insulating phase-change material confined in at least one container made of a flexible or semirigid material that is deformable; and
said container(s) being disposed around said pipe(s).

The inventors have found that confining the phase-change material in packages in the form of deformable flexible containers presents numerous advantages, and serves to solve the above-mentioned problems and drawbacks, namely:

1) it is much easier to put the PCM into place around the pipe since said containers are filled with the PCM separately and in advance;

2) the PCM can be localized in the zone where it is most effective, i.e. essentially localized close to the pipe;

3) the containers contribute to maintaining said insulating phase-change material in shape since it is subject to migration. However since said containers are flexible or semirigid, and preferably semirigid, the phase-change material can be subject to changes in volume as a result of changing phase since said containers can deform; and 4) the containers make it possible to use insulating PCMs inside the case and also to use other insulating materials outside the case that would be chemically incompatible therewith were they to come into contact.

A container is said to be "semirigid" herein when it is sufficiently rigid to keep its shape in spite of the weight and the pressure exerted by the phase-change material it contains, while nevertheless presenting sufficient flexibility to accept deformations, and in particular to follow the deformations that result from the material changing volume when it changes phase.

A preferred embodiment is characterized in that in a cross-section of said pipe(s), level with said container(s), said pipe(s) is/are surrounded by said container(s) in substantially continuous manner.

This means that said container(s) is/are distributed and assembled around each of said pipes taken separately, or around the set comprising said two pipes, in a manner that is substantially continuous, so that each pipe is thus practically entirely separated from said outer protective case by said containers. This makes it possible to ensure that the insulation around each pipe or each of said pipes is uniform, thereby avoiding the appearance of cold points.

More particularly, in the portions of the pipe(s) surrounded by said containers, the device comprises at least two and preferably three or four containers in a cross-section of said pipe(s) surrounded by said containers, and preferably surrounding said pipe(s) in a manner that is substantially continuous.

In another embodiment, the pipe(s) is/are surrounded by a single container folded onto itself in such a manner that its longitudinal edges are situated facing each other at a small distance apart.

Also preferably, said containers are placed close to the pipe in such a manner that the pipe does not come directly into contact with at least some of said containers, and preferably not with any of said containers.

The space between the PCM and the pipe makes it possible to reduce the rate at which heat is absorbed from oil leaving the wellhead during a stage of restarting production after a stoppage, thus enabling the oil to remain at temperature for as long as possible and reach the temperature $T_0$ only when it is close enough to the surface to be able to reach the surface without its temperature dropping below the temperature $T_1$ at which some of its components freeze, thus preventing flow within the pipe.

In an embodiment, said containers are placed against spacers, said spacers being placed against and around said pipe so as to leave a gap between said containers and said pipe.

It is advantageous for the distance between the pipe and a container not to be excessive, so as to reduce the quantity of PCM that needs to be implemented.

More particularly, said containers should be spaced apart from said pipe at a distance lying in the range 5 millimeters (mm) to 10 centimeters (cm), and preferably in the range 1 cm to 5 cm.

In another advantageous embodiment, said pipe is surrounded by a second insulating material that is solid and pressed against said pipe, preferably in the form of a shell of syntactic foam, with said containers being pressed against said solid insulating material surrounding said pipe.

This configuration serves to further slow down the transfer of heat from the fluid flowing in the pipe to the insulating PCM, while restarting production inside the pipe.

In a preferred embodiment, said insulating covering covered in a said leakproof protective case comprises a main insulating material, preferably an insulating gel, placed between said outer case and said container(s) of insulating phase-change material surrounding said pipe(s).

In an embodiment, said main insulating material also constitutes a phase-change material which can be identical to or different from said optionally insulating phase-change material contained in said containers.

In an embodiment, said main insulating material surrounds said pipe(s) and separates said pipe(s) from said containers in the gap between said pipe(s) and said container(s).

As mentioned above, said phase-change material presents a liquid/solid melting temperature $T_0$ that preferably lies in the range 20° C. to 80° C., that is higher than the temperature $T_1$ at which the fluid flowing inside the pipe presents an increase in viscosity that is harmful for its ability to flow in said pipe, and lower than the temperature $T_2$ of the fluid flowing in the pipe when it is in operation.

The term "insulating" material is used herein to mean a material that preferably presents thermal conductivity of less than 0.5 W/m/K, and more preferably lies in the range 0.05 W/m/K to 0.2 W/m/K.

More particularly, said insulating phase-change material comprises chemical compounds from the alkane family, preferably a paraffin having a hydrocarbon chain with at least 14 carbon atoms.

Still more particularly, said paraffin is heptacosane having the formula $C_{17}H_{36}$, and presenting a melting temperature of abut 50° C.

It is also possible to use an industrial paraffin cut centered on heptacosane.

In an embodiment, said main insulating material situated in particular between said containers and said outer case is constituted by an insulating mixture comprising a first compound consisting in a hydrocarbon compound such as paraffin or gas oil, mixed with a second compound consisting in a gelling compound and/or a compound having a structuring effect, in particular by cross-linking, such as a second compound of the polyurethane type, of the cross-linked polypropylene type, of the cross-linked polyethylene type, or of the silicone type, and preferably said first compound is in the form of particles or microcapsules dispersed within a matrix of said second compound.

As first compounds, more particular mention can be made of chemical compounds of the alkane family such as paraffins or waxes, bitumens, tars, fatty alcohols, glycols, and still more particularly compounds having a melting temperature of the materials lying in the range between the temperature $T_1$ of the hot effluent flowing in one of the pipes and the temperature $T_2$ of the medium surrounding the pipe in operation, i.e., in fact and in general, a melting temperature lying in the range 20° C. to 80° C. For example, it is possible to use heptacosane having the formula $C_{17}H_{36}$ as the paraffin, which presents a melting temperature of about 50° C.

These various insulating materials are materials that are "subject to migration", i.e. materials that are liquid, pasty, or of a solid consistency such as the consistency of a grease, a paraffin, or a gel, which can be deformed by the stresses that result from differential pressures between two distinct points of the case and/or because of temperature variations within said insulating material.

That is why, according to another characteristic of the present invention, a device for thermally insulating at least one undersea pipe has at least two leakproof transverse partitions, each of said partitions being constituted by a closed rigid structure through which said pipe(s) pass(es), and secured to said pipe(s) and to said case, with said containers being disposed around said pipe(s) between said two transverse partitions.

This rigid structure secured to the case prevents said case moving past said partition and relative thereto, thus freezing the geometry of the cross-section of the case and said partition.

The terms "leaktight" and "closed" mean that said partition does not allow the material constituting said insulating covering from passing through said partition, and in particular that the junction between said pipe and the orifices through which the pipe passes through said partition does not allow said insulating covering material to pass through.

Said leaktight partitions serve to confine said insulating material(s) that are subject to migration and that constitute said insulating covering between said case and said partitions.

The term "cross-section" is used to mean the section in a plane XX', YY' perpendicular to the longitudinal axis ZZ' of said case, said case being tubular in shape and presenting a central longitudinal axis ZZ', and the cross-section of said case preferably defines a perimeter presenting two mutually perpendicular axes of symmetry XX' and YY' that are perpendicular to the longitudinal axis ZZ'.

In a particular embodiment, said closed structure of said leaktight transverse partition comprises a cylindrical piece presenting a cross-section whose perimeter presents the same fixed shape as that of the cross-section of the case.

In the present description, the term "perimeter" of a cross-section is used to mean the line in the form of a closed curve which outlines the plane surface defined by said cross-section.

The perimeter of the cross-section of the case at the leaktight partitions is of fixed shape and therefore cannot deform by contraction or expansion of said case at that point.

In different variant embodiments, said cross-section of the case is circular in shape, or oval in shape, or indeed rectangular in shape, preferably having rounded corners.

When the device has at least two pipes disposed in a common plane, the cross-section of said case is preferably elongate in the same direction as said plane.

More particularly, the outer perimeter of the cross-section of said protective case is a closed curve for which the ratio of the square of the length over the area it defines is not less than 13, as described in WO 00/04886.

During variations in the internal volume, the case tends to deform towards a circular shape which, mathematically, constitutes the shape that presents the largest area for given perimeter.

For a leakproof case of circular profile, an increase in volume leads to stresses in the wall, which stresses are associated with an increase in pressure that results from this increase in volume.

In contrast, if the shape of the cross-section of the outer covering is flattened, the ability of its case for absorbing expansion due to the various compounds expanding under the effect of temperature, without creating significant extra pressure, is improved since the case can become rounder.

If the profile is oval in shape, a variation in internal pressure will lead to a combination of bending stresses and pure traction stresses since the varying curvature of the oval then behaves like an architectural vault, but with the difference that under such circumstances the stresses are traction stresses and not compression stresses. Thus, a shape that is oval or close to oval can be envisaged for small expansion capacity, and under such circumstances it is appropriate to consider oval shapes having a ratio of major axis ρmax over minor axis ρmin that is as high as possible, for example at least 2/1 or 3/1.

The shape of the case is then selected as a function of the total expansion of the volume of the outer insulating coating under the effect of temperature variations. Thus, for an insulating system mainly using materials that are subject to expansion, a rectangular shape, a polygonal shape, or indeed an oval shape can enable the wall to expand by bending while minimizing the traction stresses within the outer case.

For an insulating material presenting a high degree of expansion under the effect of temperature variations, such as gas oil, substances in the alkane family (paraffin), or indeed phase-change materials, the rectangle should be flatter so as to create the necessary expansion reserve. This expansion reserve can be further increased by creating reentrant curves, in known manner.

Said partitions create thermal bridges. It is therefore desirable to space them apart as much as possible in order to reduce the thermal bridges.

In a particular embodiment, the spacing between two such successive leaktight partitions along the longitudinal axis ZZ' of said case lies in the range 50 m to 200 m, and in particular in the range 100 m to 150 m.

In order to reduce the number of leaktight partitions, according to a preferred characteristic, a device of the invention comprises one, and preferably a plurality, of shaping templates disposed transversely to said longitudinal axis ZZ', each constituted by an open rigid structure secured to said pipe(s) which pass through it, and secured to said case at its periphery, being disposed between two of said successive leaktight partitions, and preferably at regular intervals along said longitudinal axis ZZ', said shaping template preferably presenting openings allowing the material constituting said main insulating material to pass said shaping template.

Like said leaktight partition, said shaping template freezes the shape of the cross-section of the case at said shaping template, while minimizing heat bridges.

More particularly, said open structure of said shaping template comprises a cylindrical part of a cross-section whose perimeter is inscribed within a geometrical figure identical to the geometrical figure defined by the shape of the perimeter of the cross-section of said leaktight partition.

Preferably, the device of the invention has a plurality of shaping templates disposed along said longitudinal axis ZZ' of the case, preferably at regular intervals, with two successive shaping templates being spaced apart preferably by 5 m to 50 m, and more preferably by 5 m to 20 m.

In a preferred embodiment, the device has at least one centralizing template disposed transversely to said longitudinal axis ZZ', preferably at regular intervals, between two successive ones of said leaktight partitions and/or between two of said shaping templates along said longitudinal axis ZZ', each centralizing template being constituted by a rigid part secured to the pipe(s) and presenting a shape which allows limited movement of said case in contraction and in expansion level with said centralizing template, said containers being disposed between two successive centralizing templates, where appropriate.

The centralizing template seeks to ensure that there is some minimum covering of insulating covering (3) around said pipe(s) in the event of the case deforming by contraction and transferring said displaceable material between said two leaktight partitions and/or between said shaping templates.

More particularly, said centralizing template is constituted by a rigid part, preferably having a cylindrical outside surface, with a cross-section whose perimeter is set back from that of said leaktight partition, serving to limit deformation of said case by the case coming directly into mechanical abutment on said rigid part at at least two opposite points of the perimeter of the cross-section of said case.

Said centralizing template presents a cross-section whose perimeter is inscribed within a geometrical figure which is substantially geometrically similar to the geometrical figure defined by the perimeter of the cross-section of said leaktight partition.

In an embodiment, said rigid part constituting said centralizing templates presents a portion of its outside surface that is set back sufficiently from the surface of the case, and/or presents through perforations, to establish a gap which allows the material constituting said main insulating material to be transferred through said centralizing template.

The distance between two centralizing templates along said longitudinal axis ZZ' is such as to enable it to maintain a quantity of the material comprising said insulating coating that is sufficient to provide a minimum covering needed for thermally insulating said pipe, given the contraction deformation to which said case can be subjected.

Advantageously, the device of the invention has a plurality of centralizing templates, with two successive centralizing templates being spaced along said longitudinal axis ZZ' of the case by a distance of 2 m to 5 m, with said containers being interposed between two successive centralizing templates.

More particularly, the present invention provides a device of the invention including at least two of said underwater pipes placed in parallel.

Under such circumstances, and advantageously, said leaktight partitions, shaping templates, and centralizing templates serve to keep said at least two undersea pipes at a fixed distance apart.

The present invention also provides a unit thermally insulating device suitable for use in building up a device of the invention by assembling said unit thermally insulating devices end to end, the unit device being characterized in that it comprises:

one or more unit undersea pipe elements occupying the place of the undersea pipe(s); and a said protective case and a said covering comprising a said container containing a said phase-change material, and, as defined above, each said unit element comprising at at least one of its ends or at each of its ends a said leaktight partition, and preferably said centralizing templates, and more preferably said shaping templates as defined above, disposed between two successive leaktight partitions.

The invention also provides a method of assembling a unit device of the invention, the method being characterized in that it comprises the following steps:

a) where appropriate, positioning said unit pipe element(s) relative to said leaktight transverse partitions, said centralizing templates, and said shaping templates, then b) installing said spacers on said unit pipe elements, or installing a said solid insulating material against the wall of said unit pipe element; and c) pressing said containers containing a said phase-change material against said spacers or against a said solid insulating material; and d) inserting the assembly as obtained in step c) in a said outer case; and e) where appropriate, injecting a said main insulating material into the space between said containers and the outer case, and where appropriate into the space between said containers and the walls of said unit pipe element(s).

In a preferred implementation of said assembly method, said main insulating material is a mixture comprising various components which are mixed together and then injected in the liquid state into the various compartments defined by said two successive leaktight partitions and said insulating material becomes transformed into a gel by at least one of its said components cross-linking.

This type of gelled matrix has the effect of limiting convection.

Finally, the present invention provides a method of thermally insulating at least one undersea pipe characterized in that unit thermal insulating devices are made as defined above, and the unit thermal insulating devices are assembled together end to end as described above.

BRIEF DESCRIPTION OF THE DRAWINGS

Other characteristics and advantages of the present invention appear better on reading the following description made in non-limiting illustrative manner with reference to the accompanying drawings, in which:

FIG. 6 is a side view of a device of the invention in an application to a riser, showing the problems of migration of an insulating material that is fluid or semisolid.

FIGS. 7, 8, and 9 are section views showing the cross-section of the device at levels a-b-d and e in FIG. 6, respectively for each of the types of device, i.e. of circular case (FIG. 7), of oval case (FIG. 8), or of rectangular case with rounded corners (FIG. 9).

DETAILED DESCRIPTION OF THE PRESENTLY PREFERRED EMBODIMENTS

1) Making Containers Of Phase-change Material

The containers may be prefabricated at low cost by using materials of the polyethylene type, of the polypropylene type, or of any other plastics material, with shaping being obtained by injection molding, blow molding, or rotary molding. Wall thickness depends on the strength of the basic material used; in general it is a few millimeters so as to ensure sufficient mechanical strength for allowing said containers to be handled after they have been completely filled and finally sealed, while still having sufficient flexibility to accommodate variations in internal volume by deforming.

For a PCM whose chemical composition is incompatible with the main insulating material, for example a PCM based on metallic salts with a main insulating material based on a gel, the container is advantageously made from a sheet of metal which does not react chemically with said PCM, for example a stainless steel, which sheet having a thickness of a few tenths of a millimeter being shaped, for example by stamping, and with peripheral sealing being provided by continuous leaktight peripheral welding. The container is then completely filled with PCM and sealed in definitive manner by welding a plug to its filler orifice.

2) Disposing Containers of PCM Around the Pipes of a Bundle Comprising Two Pipes In FIGS. 1 to 5 and 20, there can be seen a thermally insulating device in cross-section (FIGS. 1 to 5) or in longitudinal section on the axial longitudinal direction ZZ' (FIG. 20) of a device for thermally insulating two undersea pipes 1 comprising the following:

an insulating covering comprising containers $3_2$ of phase-change material (PCM) $3_1$ surrounding the set of pipes or each of said pipes 1, said containers $3_2$ of PCM $3_1$ themselves being surrounded by a main insulating material $3_3$;

said insulating covering being itself covered by a leakproof protective case 2; and said case being of tubular shape, presenting a longitudinal axis of symmetry ZZ', with the cross-section of said case 2 defining a perimeter presenting two axes of symmetry XX' and YY' that are perpendicular to each other and to said longitudinal axis ZZ'.

The main insulating material $3_3$ is a material that is subject to migration, as described below.

Figure 2:
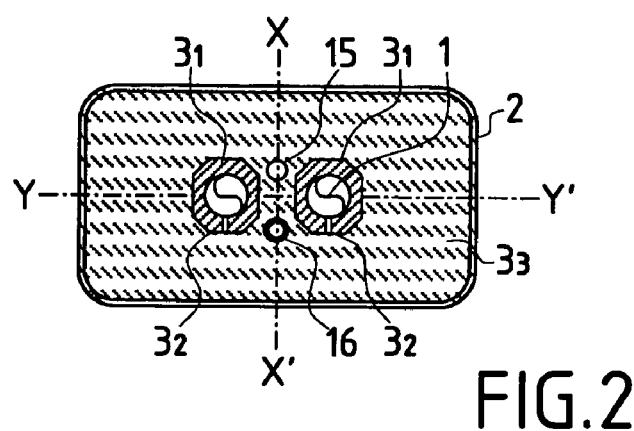
Figure 3:
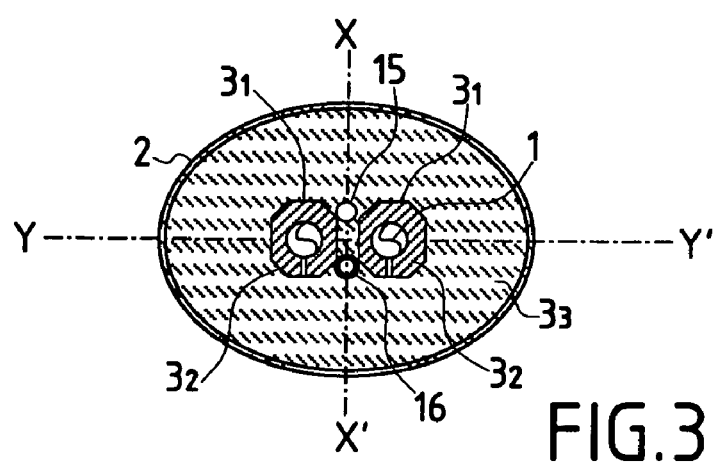

In FIGS. 2 and 3, each of said pipes 1 is surrounded by a single container $3_2$ such that in cross-section through said pipe level with said container(s), each of said pipes is completely surrounded in substantially continuous manner by said container(s). The only residual gaps $3_5$ between said containers being provided to make it possible, where appropriate, to inject a main insulating material $3_3$ between the pipes 1 and said containers, as described below.

Figure 1:
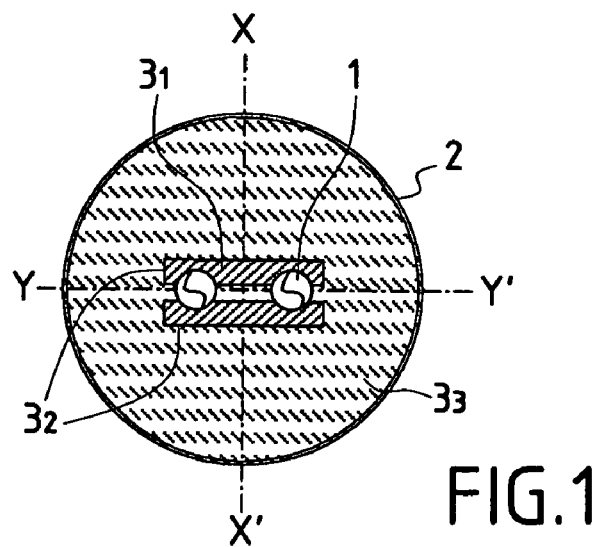
FIGS. 1, 2, and 3 are cross-section views of a bundle in the portion of the pipes 1 that is surrounded by said containers $3_2$ in which the cross-section of the case is circular in shape (FIG. 1), rectangular with rounded corners (FIG. 2), or oval (FIG. 3).
Figure 4:
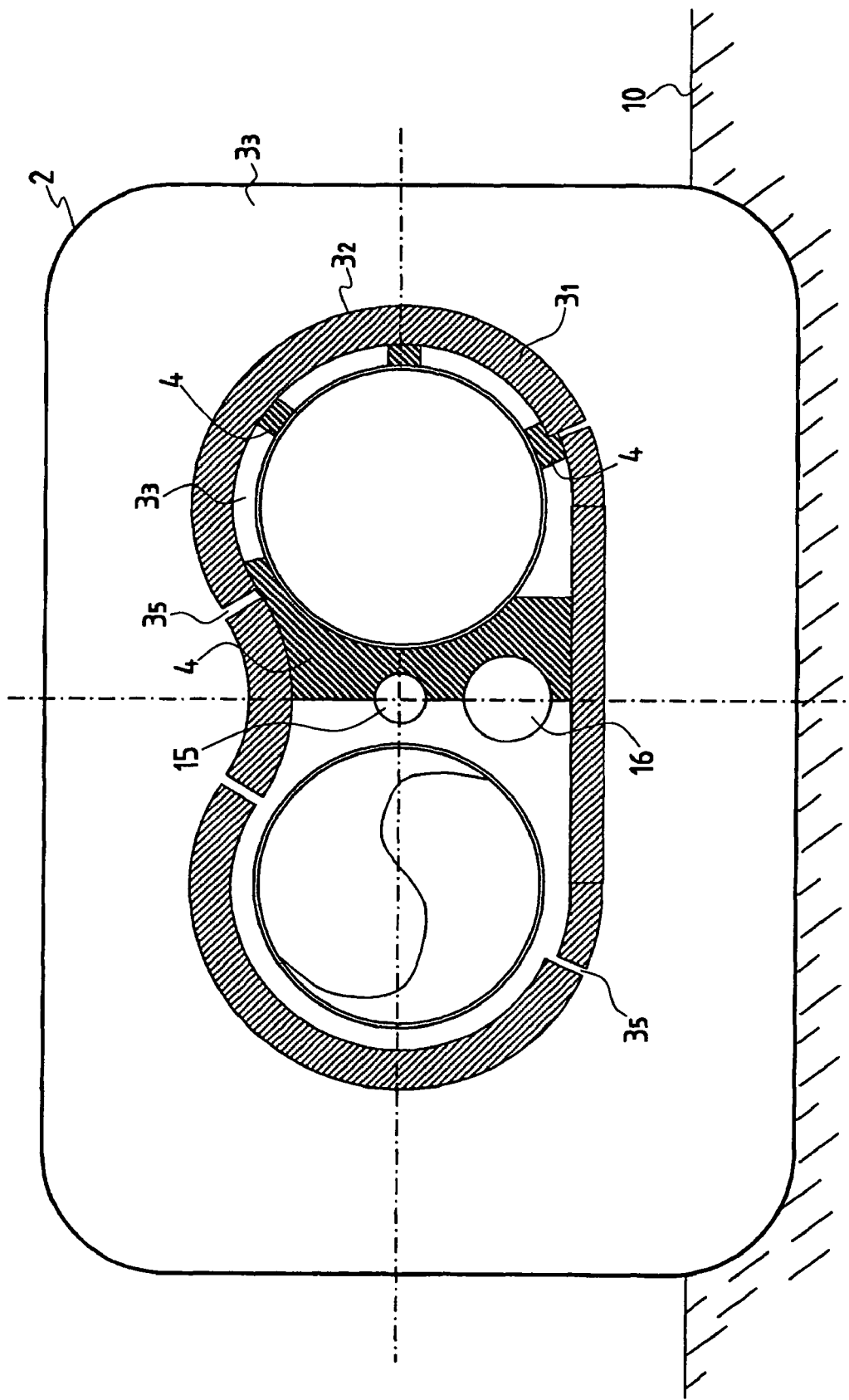
FIGS. 4 and 5 are cross-section views of a bundle of two pipes surrounded by four containers in a manner that is substantially continuous, with spacers 4 (FIG. 4) or shells of syntactic foam $3_4$ (FIG. 5).
Figure 5:
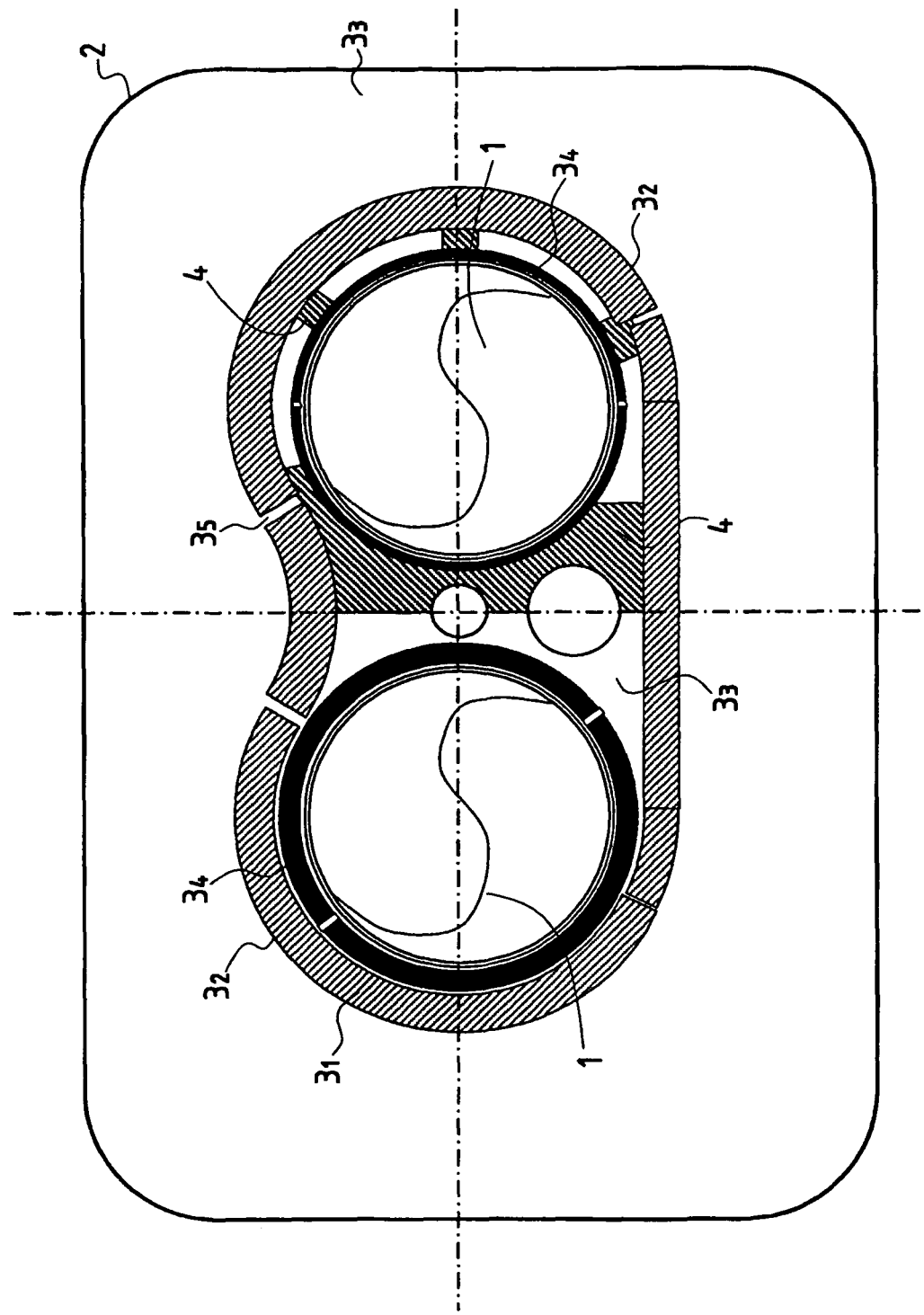

In FIGS. 1, 4, and 5, there can be seen a cross-section through a bundle of two pipes, the two pipes being surrounded together by a set respectively of two containers or of four containers that are distributed and assembled around the set of two pipes in a manner that is substantially continuous.

In FIGS. 2 and 3, each of the pipes is surrounded by a single respective container that is folded over onto itself in such a manner that its longitudinal edges face each other, preferably close together so as to form a C-shape. Thus, during variations in the volume of the container, the container can deform and the C-shape can tend to open.

In FIG. 1, the outer case 2 is circular and made of a flexible thermoplastic material.

In FIGS. 2, 4, and 5, the outer case 2 presents a cross-section in the form of a rectangle with rounded corners, while in FIG. 3, it has the shape of an ellipse.

In FIGS. 2 to 5, the outer case 2 may be made of steel sheet or of composite material.

FIGS. 1 to 5 also show, inside the bundle, an auxiliary heater pipe 15 and a pipe for injecting water, or an electric cable 16.

In FIG. 4, the containers $3_2$ are disposed on spacers 4 resting on and distributed around the pipes 1, the spacers being shown only in the right-hand half of FIG. 4. Said spacers serve to leave a gap between the containers $3_2$ and the walls of the pipes 1, which gap is several centimeters across, for example 3 cm. The gap created in this way between the containers $3_2$ and the pipes 1 thus provide insulation, making it possible to avoid transferring too quickly the heat that comes from the fluid flowing in the pipes 1 and that flows into the PCM while the installation is being restarted after production has been stopped. Advantageously, this is done by filling the gap between the containers $3_2$ and the pipe 1 with an insulating material which can be constituted, as in FIG. 4, by the main insulating material $3_3$ as described below, i.e. a substance of the gel type which is injected in liquid form prior to setting in situ.

FIG. 5 shows another embodiment on the left-hand side in which the containers $3_2$ rest directly on shells $3_4$ of syntactic foam placed directly against the walls of the pipe 1. On the right-hand side of FIG. 5, the shells of syntactic foam rest directly on said pipe, while said containers $3_2$ rest on spacers 4. The gap between the pipe and the two shells of syntactic foam $3_4$ is thus more easily filled with the main insulating material $3_3$, with this filling operation being made possible by injecting said insulating material into openings situated in the longitudinal direction ZZ' and not shown in the cross-section of FIG. 5, as examined below.

The thin shells of syntactic foam may be several millimeters thick, e.g. 12 mm thick, constituting additional high performance insulation that withstands pressure.

FIGS. 4 and 5 show a bundle that is designed to rest on the sea bottom 10. The coefficient of heat exchange between the bundle and the outside is smaller through its underface zone directly in contact with the sea bed, since the sea bed is more insulating than the flowing water which is generally at 4° C. and which covers the top and side portions of the bundle which are in contact with the water. That is why, as shown in FIGS. 4 and 5, the thickness of the PCM $3_1$ included in the container underneath the pipes 1 can be less than the thickness of the other containers $3_2$ surrounding the sides and the tops of the pipes 1. This advantageously optimizes the distribution of PCM around the pipes as a function of heat-transfer requirements.

3) Distribution of PCM Containers Between Leaktight Partitions Disposed Along the Longitudinal Direction ZZ'

Figure 16:
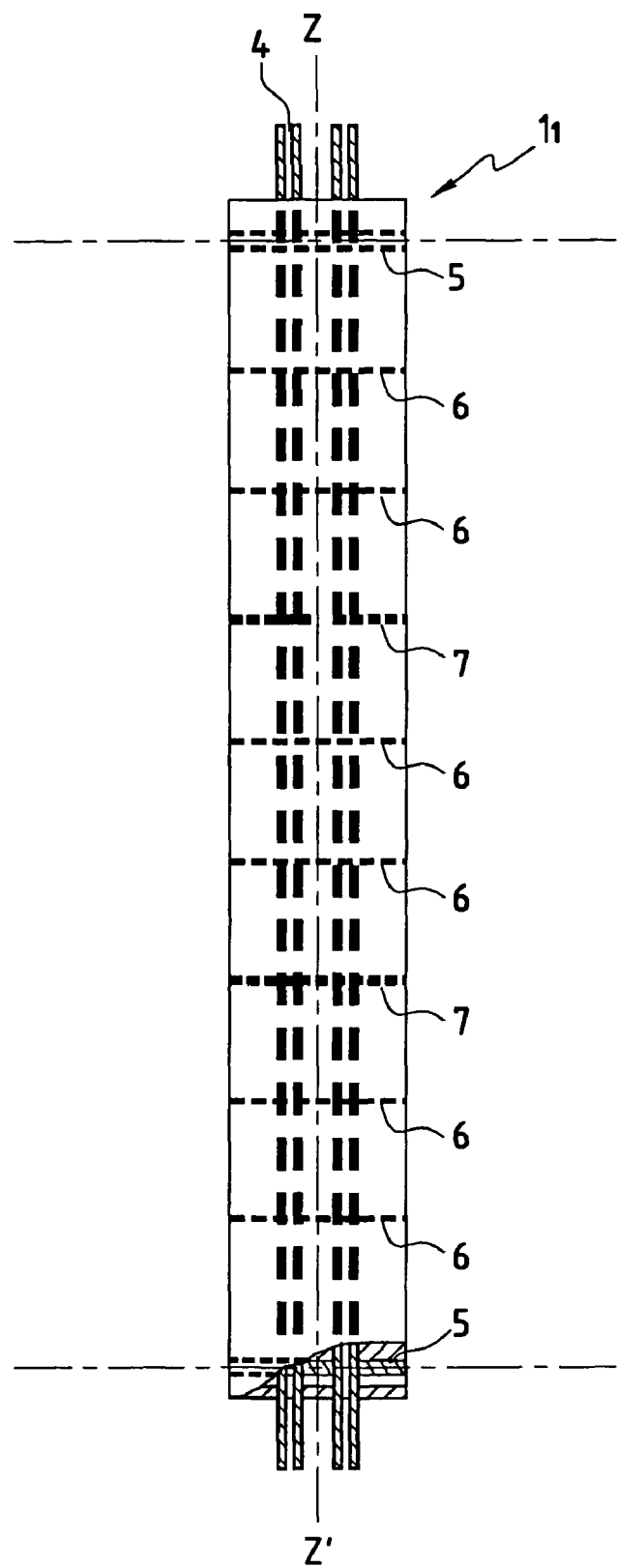
FIG. 16 is a side view of a device of the invention presenting a plurality of leaktight partitions, centralizing templates, and shaping templates.
Figure 20:
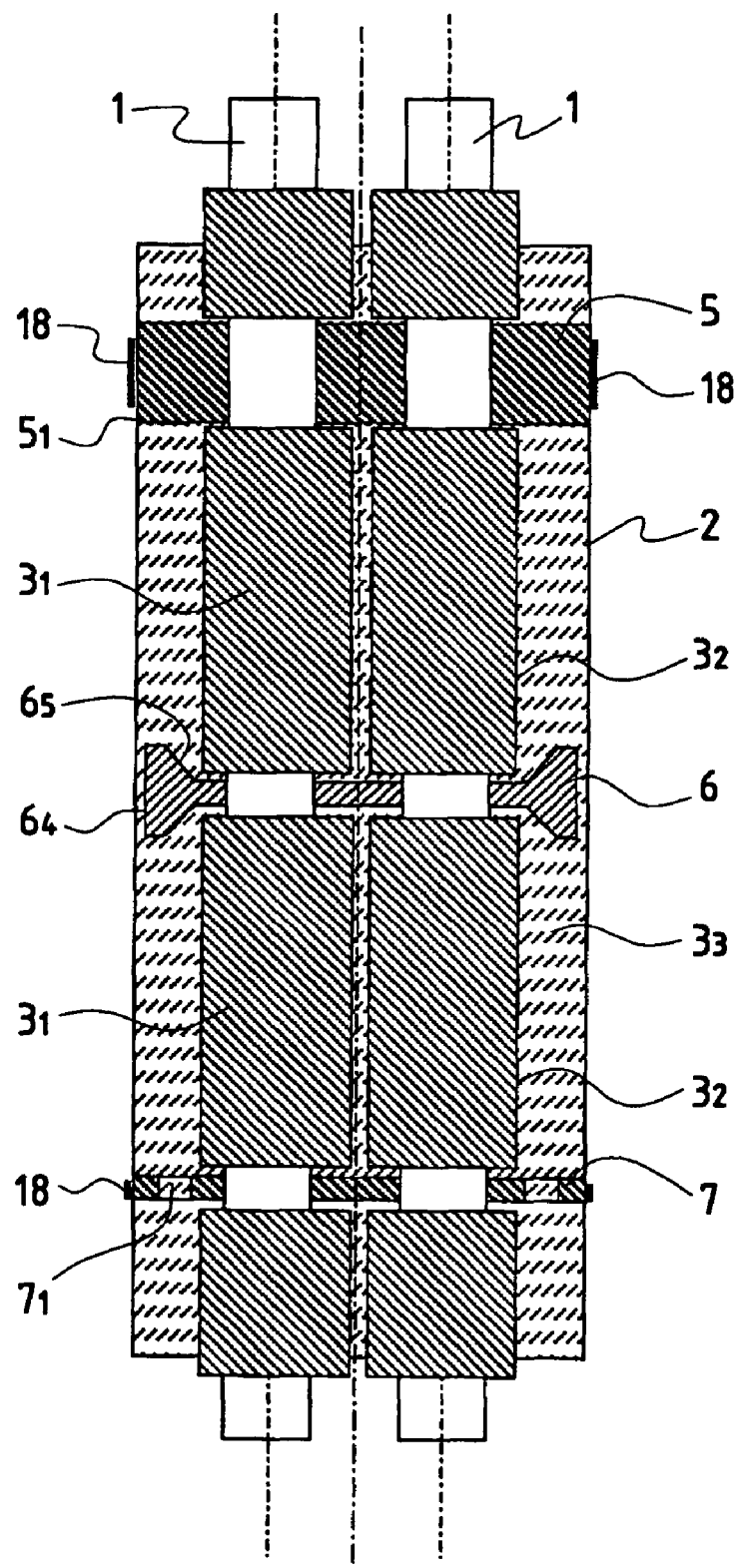
FIG. 20 is a longitudinal section of a device of the invention presenting containers of PCM distributed in the longitudinal direction ZZ' between a leaktight partition, a centralizing template, and a shaping template.

FIGS. 6, 16, and 20 are longitudinal section views on the axis ZZ' showing a device for thermally insulating two undersea pipes 1, said device comprising:

a thermally insulating covering $3_1$-$3_3$ surrounding said pipe(s);

said covering itself being covered by a leakproof outer protective case 2, and said case 2 being made of a material that is flexible or semirigid, that is suitable for remaining in contact with the outside surface of said insulating covering 3 as it deforms; and said case itself being tubular in shape presenting a longitudinal axis of symmetry ZZ', the cross-section of said case defining a perimeter presenting two axes of symmetry XX' and YY' that are perpendicular to each other and to said longitudinal axis ZZ'.

In the longitudinal section views on the axis ZZ', there can be seen leaktight transverse partitions 5, each of said partitions being constituted by a closed rigid structure through which the pipe(s) pass(es), said structure being secured to said pipe(s) and to said case, and said containers are disposed around said pipe(s) between two of said transverse partitions.

FIG. 6 is a side view of a portion of a thermally insulated riser 11 comprising an outer case 2 made either of thermoplastic material, or of steel, or indeed of composite material, of section that may be circular as shown in FIG. 7, or elliptical as shown in FIG. 8, or indeed rectangular with rounded corners as shown in FIG. 9.

Said portion of riser $1_1$ has two pipes 1 installed near its center, and at its top end (a) and its bottom end (b) it has respective leaktight partitions 5 serving to co-operate with the outer case 2 to confine the insulating material 3. Said leaktight partitions 5 support said pipes 1 and hold them at a fixed distance apart from each other and at a fixed distance from the case.

Figure 10:
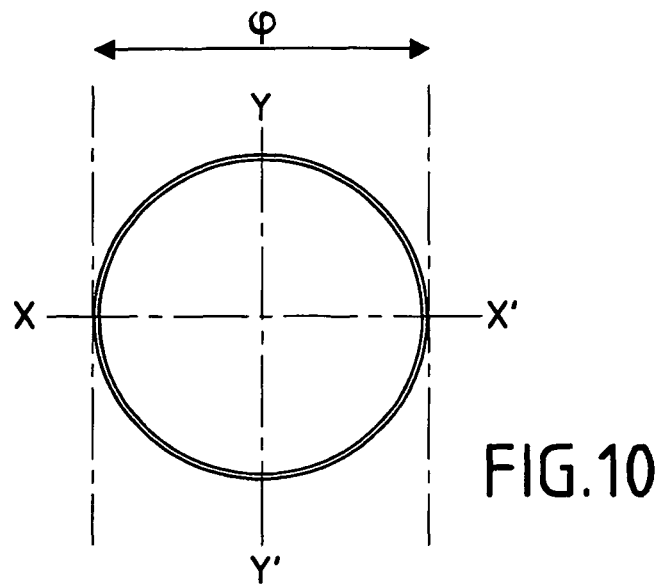
FIGS. 10, 11, and 12 show various steps in obtaining an oval case device (FIG. 12) starting from a circular case device (FIG. 10) by imparting deformation beyond the elastic limit (FIG. 11).
Figure 11:
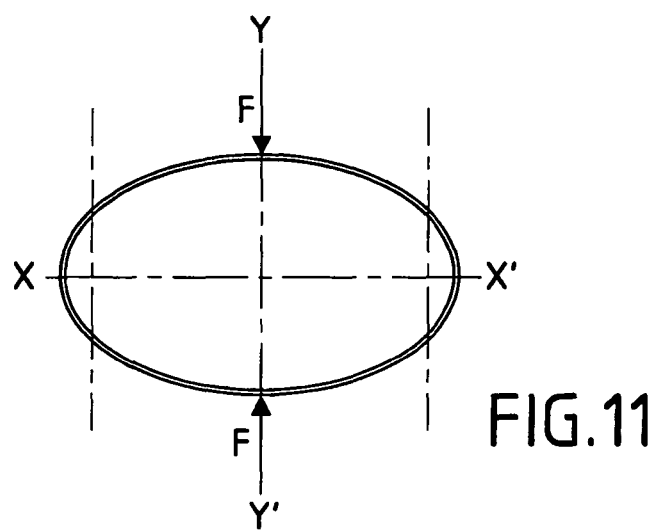
Figure 12:
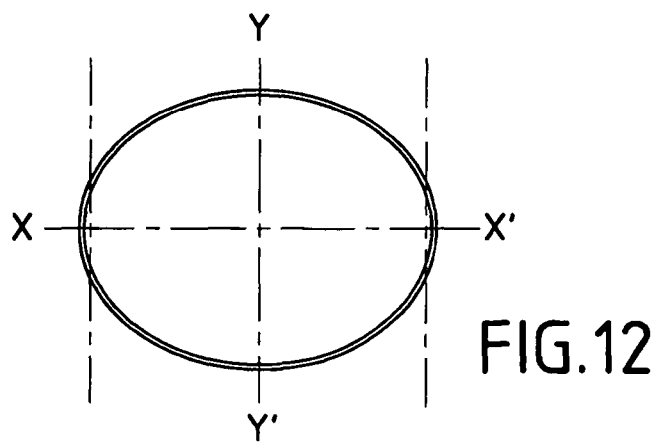
Figure 13:
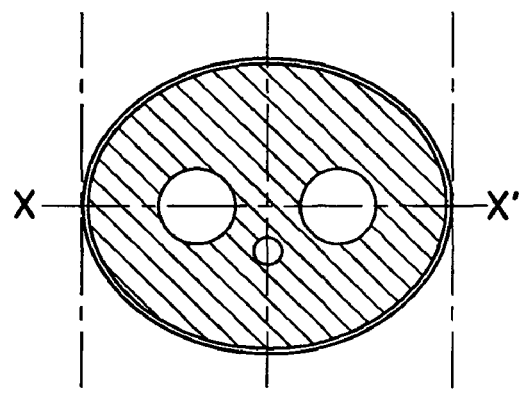
FIGS. 13, 14, and 15 are cross-section views of an oval case device level with a leaktight partition (FIG. 13), and level with a centralizing template (FIGS. 14 and 15), said casing being shown in contraction (FIG. 14) and in expansion (FIG. 15).
Figure 14:
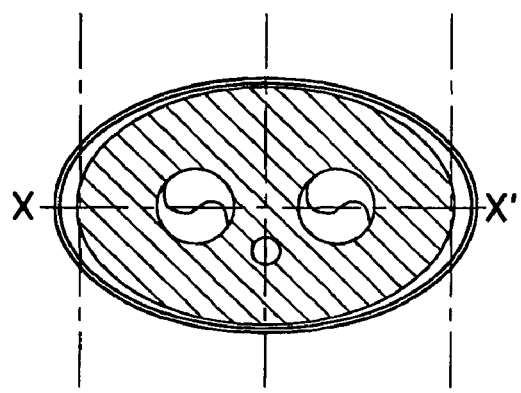
Figure 15:
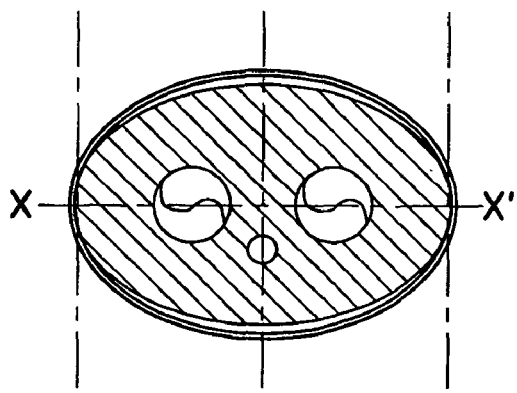

FIGS. 10, 11, and 12 show the section of the outer steel case of a bundle, respectively when it is circular in shape on being manufactured (FIG. 10), subsequently deformed beyond its elastic limit in a press by application of a force F (FIG. 11), and then constituting, after the force F has been released, an outer case for a flat bundle, the case being substantially oval in section (FIG. 12).

FIGS. 6 and 16 show a portion or segment of a thermal insulation device $1_1$ referred to above as a unit thermal insulation device, comprising two leaktight partitions 5, and a plurality of centralizing templates 6 or shaping templates 7. The leaktight partitions 5, the centralizing templates 6, and the shaping templates 7 are rigid parts of cylindrical shape as shown in FIG. 20.

In FIGS. 7, 8, 9, and 13, the rigid part constituting a leaktight partition presents a cross-section having the same shape as the cross-section of the case. The leaktight partition 5 has the pipes 1 passing through it. The connection between the leaktight partition and the pipes 1 is itself leaktight, thus making it possible to confine the insulating material without leakage within the case. The leaktight partition 5 is of sufficient strength to freeze the section of the outer case level therewith (levels a and e in FIG. 6). The cylindrical outside surface $5_1$ of the rigid part constituting the leaktight partition 5 is bonded or welded to the case, and advantageously it can also be banded by an outer hoop 18 placed on the outside of the case level therewith.

Said leaktight partitions 5 are structures that are distinct from said case 2, which case presents continuity in the longitudinal direction between two points situated on either side of said partition.

In the space confined between two leaktight partitions 5 of said segment $1_1$, there are disposed both centralizing templates 6 and shaping templates 7.

The centralizing templates 6 are preferably disposed at regular intervals, for example at a distance apart of 2 m to 5 m. They are likewise constituted by respective rigid parts secured to the internal pipes 1, with the shape of the centralizing templates allowing the case 2 a limited amount of displacement in contraction and in expansion in register with said centralizing template 6, and more particularly said displacement of the case 2 in register with such a centralizing template 6 represents variation lying in the range 0.1% to 10%, and preferably in the range 0.1% to 5% of the distance between two opposite points $2_1$-$2_2$, $2_3$-$2_4$ of the perimeter of the cross-section of said case.

Figure 17:
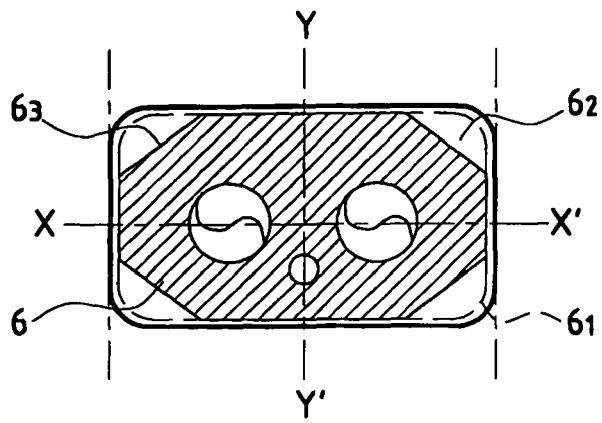
FIGS. 17, 18, and 19 are cross-section views of a device of the invention comprising a case of rectangular shape with rounded corners level with a centralizing template, respectively when at rest (FIG. 17), during expansion of the case (FIG. 18), and during contraction of the case (FIG. 19).
Figure 18:
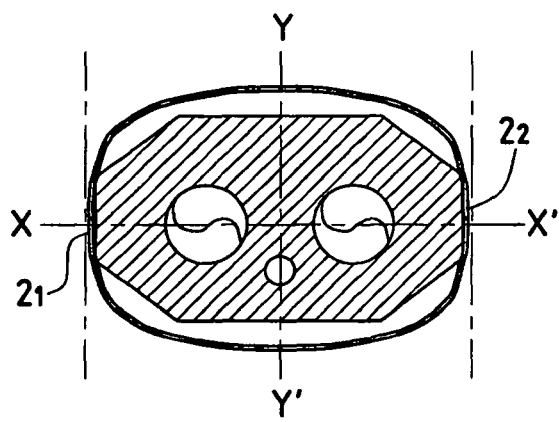
Figure 19:
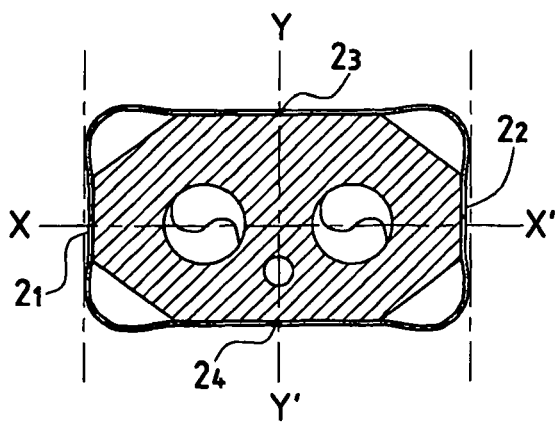

In FIGS. 17 to 19, said cross-section of said centralizing template 6 is in the form of a rectangle whose corners have been truncated by flat cuts $9_1$.

In FIGS. 14 and 15 and 17 to 19, the centralizing template 6 presents a cross-section of perimeter that is inscribed inside a first geometrical FIG. $6_1$ having the shape of a rectangle with rounded angles (FIG. 17), an oval shape (FIG. 14), and substantially geometrically similar in shape to the geometrical figure defined by the perimeter of the cross-section of the leaktight partition with which it co-operates.

FIGS. 18 and 19 show that the perimeter of the cross-section of the centralizing template 6 is set back from that of the leaktight partition and thus from that of the case at rest (FIG. 13), and that it limits deformation of said case (FIGS. 18 and 19) by coming into direct mechanical abutment thereagainst at at least two opposite points $2_1$-$2_2$, $2_3$-$2_4$ of the perimeter of the cross-section of said case.

In FIG. 20, containers $3_2$ are shown that extend in the longitudinal direction ZZ' between a leaktight partition 5 and a centralizing template 6, and others between a centralizing template 6 and a shaping template 7.

The containers $3_2$ are filled with a phase-change material $3_1$ and they are surrounded by a main insulating material $3_2$ that is fluid or pasty, and thus subject to migration.

In the event of the inside of the case being at a pressure higher than the outside (see zone b in FIGS. 6 and 18), if the case 2 is not circular but presents a shape that is flattened, in particular oval or rectangular having a major axis of symmetry XX' and a minor axis of symmetry YY' that are perpendicular to each other and situated in the plane of the cross-section, then the perimeter of the cross-section of the case will tend to become more circular. Under such conditions, mechanical abutment and thus contact between the case and said centralizing template takes place solely at opposite points $2_1$, $2_2$ of said case situated on the major axis of symmetry XX', such that expansion of said case along the minor axis of symmetry YY' is also restricted (see zone b in FIGS. 6 and 18) so the cross-section of said case can thus remain flat in shape (i.e. not circular).

In contrast, in the event of the pressure outside the case being greater than the pressure inside the case, then mechanical abutment and contact between the case and said centralizing template takes place simultaneously at the opposite points $2_1$, $2_2$ of said case situated on the major axis of symmetry XX', and at the opposite points $2_3$, $2_4$ of said case situated on the minor axis of symmetry YY' in the plane of the cross-section, such that said contraction of said case is restricted (see zone d in FIGS. 6 and 19). This avoids the case imploding at these points.

At its periphery, mainly in the zones where it makes contact with the case, the centralizing template 6 advantageously presents a contact area $6_4$ that is sufficiently broad to avoid damaging the outer case 2 when the bundle "breathes". In contrast, the central portion of the centralizing template can be hollowed out, as shown at $6_5$ in FIG. 20, so as to minimize thermal bridges while retaining sufficient material to ensure that the centralizing template remains sufficiently rigid.

The shaping templates 7 are rigid cylindrical parts of smaller thickness having, like the leaktight partitions 5, the function of fixing the shape of the cross-section of the case at their level, which section is preferably identical to that imposed by the leaktight partition 5. The contact area between the peripheral surface of the cylinder constituting the part is thus of smaller height than for the centralizing templates or the leaktight partitions, as can be seen in FIG. 20, so as to minimize thermal bridges, but like the leaktight partitions, they are secured to the case by adhesive or welding, and preferably by banding by a hoop 18 on the outside of the case.

The shaping template 7 is not leaktight since it has openings $7_1$ which allow the insulating material to pass through, particularly while filling with the main insulating material $3_3$, which material is fluid or semifluid and preferably presents very low viscosity. The shaping template 7 is secured to the internal pipes 1 and maintains a fixed distance between them as do the leaktight partitions 5 and the centralizing templates 6. The shaping template 7 also keeps the internal pipes 1 at fixed distances from the case 2 level with the shaping template 7.

Successive shaping templates 7 are preferably spaced apart at a distance lying in the range 5 m to 50 m, and more preferably in the range 5 m to 20 m, the outside surfaces of said rigid cylindrical parts constituting said leaktight partition 5 or said shaping template 7 being continuously in contact with said case 2. It should be understood that the term "continuously" contact means that said contact is made over the entire circumference of the periphery of the cross-section of said case.

In FIGS. 7, 8, and 9, there can be seen for each of the levels a, b, d, and e for each of the circular, oval, or rectangular types of case, respectively, and in considerably exaggerated manner, the deformations that are caused by differential pressure between the inside of the device and the surrounding medium between two leaktight partitions located respectively at levels a and e. The pressure differential acting on the case 2 is due to the difference between the density of the insulating material and that of sea water, the relative density of the insulating material generally being around 0.8 to 0.85. Thus, by way of illustration, if consideration is given to a portion of riser 1 that is 100 m long, for a main insulating material $3_3$ of relative density 0.8, the pressure differential between the top and the bottom will be 0.2 MPa, the bottom portion (level d, FIG. 6) of said riser being at reduced pressure while the top portion is at increased pressure. As a result the outer case 2 is deformed in a manner that is substantially comparable in each of the configurations, as shown in FIGS. 7, 8, and 9. The reduced pressure lower down tends to cause the case to contract, as shown between plane e and plane d where the section is at its minimum, after which it increases up to a maximum at b, and then decreases towards the nominal section as imposed by the partition 5. Depending on the type of bundle, the different kinds of deformation are shown for planes a, b, c, d, and e in FIGS. 7 to 9.

These deformations of the outer case cause the semifluid or pasty insulating material constituting said main insulating material $3_3$ to be transferred upwardly, possibly also together with said insulating phase-change material $3_1$ contained in said container $3_2$ with this running the risk of impeding proper operation of the insulation, and possibly even destroying the physical structure, since these types of insulating material that are subject to migration remain fragile and remain poor at withstanding the internal shear that is created by such internal migration.

In FIG. 7, the case 2 is circular being made of thermoplastic material, and the expansion at level b is large, whereas the contraction observed at level d remains very small since the pressure drop has less effect on its final shape.

This phenomenon of the fluid being transferred upwardly is in addition to the above-described "breathing" phenomenon due to variations in the temperature of the internal pipes which lead to variations in volume, mainly within the insulating mixture, which have the effect of amplifying deformation, particularly in the upper portion.

When a said insulating material is transferred by migration along said longitudinal direction ZZ', generally in the upward direction when said pipe is a riser or on a slope, the shape of the perimeter of the cross-section of said case 2 is not uniform along the longitudinal axis of symmetry ZZ', and said fixed shape of the perimeter of the cross-section of said leaktight partition 5 then corresponds to the cross-section of said case prior to said transfer of material, i.e. while the insulating covering $3_1$-$3_3$ is uniformly distributed around said pipe along said longitudinal axis ZZ', and said shape of the cross-section of the case along said longitudinal axis is likewise uniform.

When deformation of the case 2 occurs and the shape of the outside surface of the insulating covering $3_1$-$3_3$ becomes deformed, then the shape of the perimeter of said cross-section of the case remains generally symmetrical relative to said mutually perpendicular axes XX' and YY' that are also perpendicular to said longitudinal axis of symmetry ZZ' of the case.

The leaktight partitions, the centralizing templates 6, and the shaping templates 7 are preferably made of strong materials that are poor conductors of heat, for example optionally reinforced thermoplastic materials or composite materials or even partially out of metal, and advantageously as a combination of these various technologies.

The greatest diameters of the leaktight partitions, the centralizing templates, and the shaping templates in their cross-sections are of the order of 1 m to 1.5 m, or even 2 m, depending on the overall size of the devices of the invention and also corresponding to case thicknesses of about 15 mm to 40 mm for cases that are flexible being made of polyethylene and polypropylene the thermoplastic materials, and about 5 mm to 8 mm for semirigid cases made of steel or composite material, and for pipes having diameters of the order of 100 mm to 400 mm.

Figure 21:
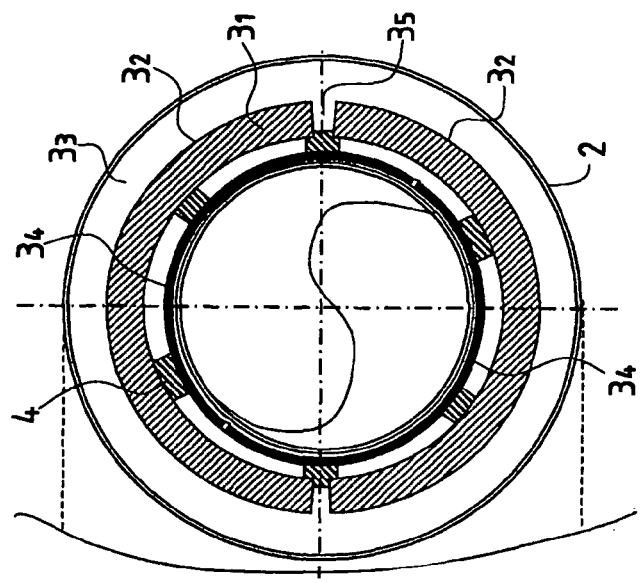
FIG. 21 is a cross-section view of a device of the invention having a single pipe, shown in section on plane AA' of FIG. 22.
Figure 22:
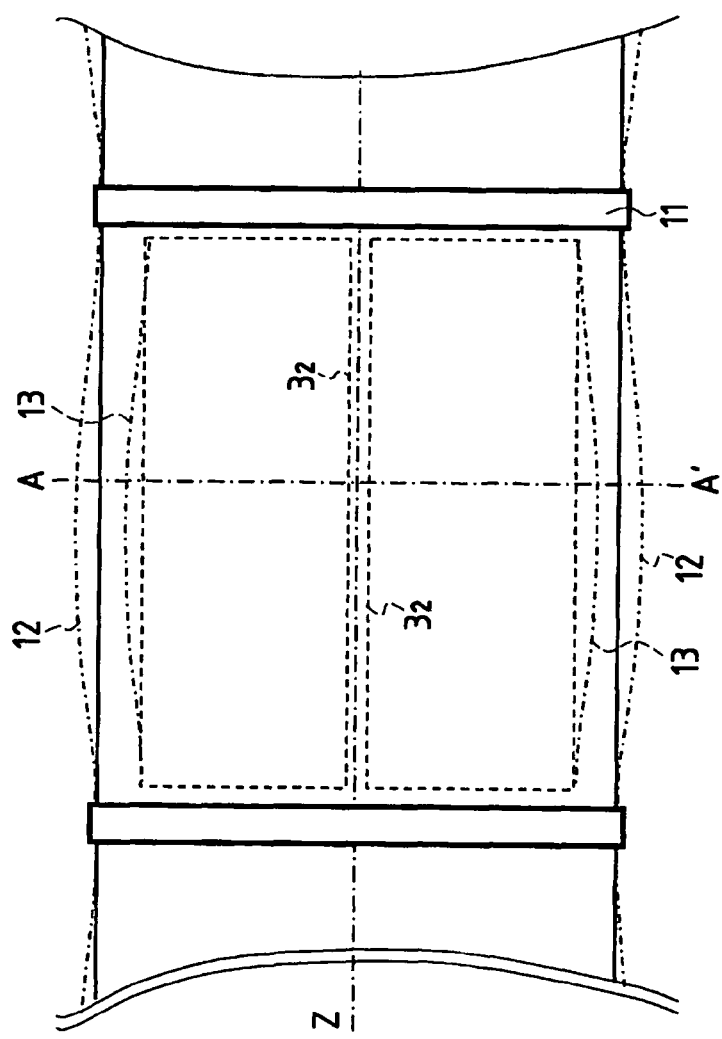
FIG. 22 is a side view of a device of the invention having a single pipe contained in an outer case held by outer band elements.

4) Distribution Of Containers in an Insulating Device Having a Single Pipe and Not Having Any Centralizing Template Or Shaping Template FIGS. 21 and 22 show a thermally insulating device of the invention containing a single undersea pipe 1 and not containing any shaping or centralizing templates insofar as the outer flexible case 2 is held in position by banding elements 11 which prevent excessive deformation of the case during any migration of said main insulating material $3_3$ and said phase-change material $3_1$ contained in the containers $3_2$.

In FIGS. 21 and 22, there can be seen a device of the invention comprising an insulated pipe contained in a polyethylene type flexible outer case 2. The pipe is covered in a first insulation system constituted by two half-shells $3_4$ of syntactic foam stuck to the outside wall of said pipe 1. These shells of syntactic foam are surrounded by two containers $3_2$ likewise in the form of half-shells and containing a PCM $3_1$. These containers $3_2$ are themselves held at a distance from shells of syntactic foam $3_4$ by spacers 4 stuck to said shells of syntactic foam.

The containers $3_2$ are held on the syntactic foam shells $3_4$ by straps (not shown).

As shown in the longitudinal view of FIG. 22 the containers $3_2$ are not incorporated between centralizing templates or shaping templates. In this case, the outer case 2 is secured to said pipe 1 via transverse partitions 5 (not shown) that are optionally leaktight, and that are situated in register with the banding elements 11 on the outside of the case 2.

The outer case is completely filled with a main insulating material $3_3$, and the gaps between the containers $3_2$ and the syntactic shells $3_4$ are there to make it easier to fill completely all of the residual space inside the case 2. Since the outer case 2 is deformable, it can deform to take up a curved shape 12 without significantly increasing its internal pressure compared with the pressure at the sea bottom, said curve 12 serving to absorb phenomena associated with variation in the internal volume 13 of the containers $3_2$ which variation can be positive or negative.

As shown in FIGS. 21 and 22, it can be seen that the containers are also distributed and spaced apart substantially continuously along the longitudinal direction ZZ' around said pipe 1 in such a manner as also to avoid creating cold points between two consecutive containers disposed along the longitudinal direction ZZ'.

5) Method of Assembling a Device for Thermally Insulating a Pipe, and Installing Said Pipe at Sea Unit segments 1 can be assembled together to form a continuous bundle having a length of several kilometers in the following manner, for example. A first segment is made initially, e.g. of length 100 m, as shown in FIG. 16 and it is fitted with its leaktight partitions. For this purpose, the internal pipes are made from 12 m-long pieces of tube that are joined together end to end by welding. Thereafter, the centralizing templates 6 and the shaping templates 7 are installed progressively, said centralizing and shaping templates being fitted, for example, with bottom wheels or skids. Where appropriate, the spacers 4 are installed on said pipes 1 between the centralizing templates 6 and the shaping templates 7, and containers $3_2$ are pressed against said spacers 4 by means of straps (not shown).

The assembly is then inserted inside the outer case 2 by pushing the prefabricated assembly as a single piece or by joining end to end case units that are 12 m or 24 m, or longer, with said end-to-end joining being preferably performed at a distance from the ends of the inside pipes. Once the outer case is in place, said leaktight partitions 5 are installed at each end and the case 2 and the pipes 1 are connected thereto, after which the main insulating material $3_3$ is injected between the leaktight partitions into the space that remains between the pipes 1 and the containers $3_2$, and the space that remains between the containers $3_2$ and the case 2. Care is taken to allow the end of the outer case that is to be extended to project by a certain length, e.g. by 20 cm, and also to allow the internal pipes 1 to project by a certain amount, e.g. the first pipe by 1 m and the second pipe 1.5 m, such that the zones in which the welded joints are to be made are offset from one another, thereby allowing access for welding equipment and for inspection equipment. The prefabricated segment is then towed towards the sea so as to release the working zone, and the following segment is made in similar manner. When the outer case 2 is put into place around this new segment, it is brought face to face with the case that has already been made at one end of the preceding segment, and the ends are welded together. At the other end, a leaktight partition 5 is installed which is secured to said outer case and to the pipes, after which the case is filled with insulating material. Care is taken to allow the pipes 1 to project by different lengths from the outer case as described above so as to facilitate welding and inspection operations, and the operation is repeated until a sufficient total length has been obtained.

If electrical cables or umbilical cables are to be installed within the device, an additional pipe is provided to act as a sheath for the cable, and the cable is drawn along said sheath only after the complete length of the bundle has been assembled, which length may be as much as several kilometers.

Once the entire line has been made, e.g. to a length of 2500 m, it is pulled to the sea, and towed to the site where it is to be installed, which site may be several hundreds of kilometers away. Thereafter, it is either put into place on the bottom, or else it is stood up in a vertical position so as to be secured to an anchoring base, for a hybrid riser tower, or indeed so as to be installed in a simple catenary configuration suspended from an anchored support floating on the surface.

6) Injecting a Main Insulating Material $3_3$ into the Inside of the Case

In a preferred version of the invention, the main insulating material $3_3$ is advantageously made as a cross-linked gel that presents a high degree of stability, for example a compound of the polyurethane type or of the silicone type, which on cross-linking creates a gel that is substantially continuous, and which acts as a matrix containing dispersed therein a liquid such as a paraffin, gas oil, or any other compound presenting a low level of thermal conductivity. While it is being made, it is advantageous also to incorporate solid compounds in the main insulating material $3_3$, for example microspheres of glass, which have the function of reducing the thermal conductivity of the mixture, or fiber matrices whose function is to reduce the convection of particles remaining in the liquid state within said main insulating material $3_3$.

The various components are mixed together and then blended energetically so as to obtain a uniform slurry which can then be injected in liquid form and thus fill all of the empty residual space in the segment that is defined between two consecutive leaktight partitions. Prior to injecting the fluid main insulating material $3_3$, the segment is advantageously evacuated so as to avoid leaving any residual pockets of gas. The vacuum created in this way is certain to cause the case to implode locally, but the case will return to its initial shape as soon as the necessary and sufficient quantity of fluid has been injected. Precautions are naturally taken to ensure that the shaping and centralizing templates 7 and 6 are dimensioned and spaced apart appropriately so that such temporary implosion has no significant repercussions on the integrity of the outer case 2.

The homogenized fluid injected in this way is in the liquid state while filling is taking place, but once the binder has cross-linked it transforms into a gelled matrix within which the other component(s) is/are held captive, which component(s) remain(s) in the liquid state or likewise become(s) a gel, thereby greatly reducing convection phenomena.

The binder components, e.g. polyurethanes or silicone-based compounds, are preferably selected in such a manner that polymerization begins only after several hours, for example after a minimum duration of 6 hours to 8 hours, thus making it possible with reasonable mixing and pumping means to make insulating devices having a diameter of 1 m and a unit segment length of about 100 m within the available time lapse.

The unit length could also be shortened or lengthened by using injection means of smaller or greater capacity, or indeed by using components, optionally including retarders, whose workability time is shorter or longer, the essential point being that the entire injection operation must be terminated before gelling or cross-linking reaction has been initiated to any significant extent.

By operating in this way, the filling of the bundle is considerably simplified, since the complicated tasks needed in the prior art for installing absorbent matrices and causing the insulating fluid to percolate therethrough are avoided, as indeed are operations that consist in injecting an insulating mixture such as paraffin while it is hot and that is liable to shrink considerably on passing from the liquid state to the solid state.

The invention claimed is:

1. A device for thermally insulating at least one undersea pipe, the device comprising:
    a thermally insulating covering surrounding said pipe;
    said covering itself being covered by an outer leakproof protective case, and said case being made of a flexible or semirigid material suitable for remaining in contact with the outside surface of said insulating covering when it deforms;
    wherein said insulating covering comprises a phase-change material confined in a plurality of pre-fabricated containers, each of the pre-fabricated containers being entirely filled with the phase-change material and each of the pre-fabricated containers having walls made of a flexible or semirigid material that is deformable to follow deformation of said phase-change material when it changes phases, and a main insulating material disposed between said outer case and said containers; and
    said containers are disposed around and close to, but not in direct contact with, said pipe,
    wherein said main insulating material surrounds said pipe and provides separation between said pipe and said plurality of pre-fabricated containers in the gap between said containers and said pipe.

2. The insulating device of claim 1, wherein in a cross-section of said pipe, level with at least one of said containers, said pipe is surrounded by said at least one container in a substantially continuous manner.

3. The insulating device of claim 1, wherein said main insulating material is an insulating gel material.

4. The insulating device of claim 3, wherein said plurality of containers are disposed against spacers, said spacers being disposed against and around said pipe in such a manner as to leave a gap between said containers and said pipe.

5. The insulating device of claim 4, wherein said containers are spaced apart from said pipe by a distance of from approximately 5 mm to approximately 10 cm.

6. The insulating device of claim 1, wherein said pipe is surrounded by a second insulating material that is solid, and is applied against said pipe; and
    wherein at least one of said containers is pressed against said solid insulating material surrounding said pipe.

7. The insulating device of claim 1,
    wherein said pipe comprises a plurality of pipes;
    wherein said container comprises a plurality of containers; and
    wherein, around the portions of each pipe about which said containers are disposed, the insulating device has at least two containers in a cross-section of said pipe surrounded by said containers.

8. The insulating device of claim 1, wherein said phase-change material presents a liquid/solid melting temperature that is lower than the temperature of the fluid flowing in said pipe when it is in operation, and higher than the temperature at which the fluid flowing inside the pipe presents an increase in viscosity that is harmful for its ability to flow in said pipe.

9. The insulating device of claim 8, wherein said insulating phase-change material comprises chemical compounds of the alkane family.

10. The insulating device of claim 9, wherein said alkane is heptacosane of formula $C_{17}H_{36}$ presenting a melting temperature of about 50° C.

11. The insulating device of claim 1, wherein said main insulating material is an insulating mixture comprising a first compound consisting of a hydrocarbon compound, mixed with a second compound consisting of at least one of a gelling compound and a structuring effect compound.

12. The insulating device of claim 11, wherein said first compound is selected from the group consisting of paraffins, waxes, bitumens, tars, fatty alcohols, and glycols.

13. The insulating device of claim 1, further comprising at least two leaktight transverse partitions, each of said partitions being formed by a closed rigid structure having said pipe passing therethrough, and secured to said pipe and to said case, and said container being disposed around said pipe between said two transverse partitions.

14. The insulating device of claim 13, wherein said transverse partitions are spaced apart along a longitudinal axis of said case by a distance of from about 50 m to about 200 m.

15. The insulating device of claim 14, further comprising a plurality of said centralizing templates, and wherein two successive centralizing templates are spaced apart along said longitudinal axis of the case by a distance of from about 2 m to about 5 m, with said containers being interposed between two successive ones of said plurality of centralizing templates.

16. The insulating device of claims 14, further comprising at least one shaping template, each said shaping template formed by a rigid structure secured to said pipe with said pipe passing therethrough, and secured at its periphery to said case, said shaping template being disposed between two successive ones of said leaktight partitions, said shaping template having openings allowing said main insulating material to pass therethrough.

17. The insulating device of claim 16, wherein said open structure of said shaping template is formed by a cylindrical part presenting a cross-section of perimeter that is inscribed in a geometrical figure identical to the geometrical figure defined by the shape of the perimeter of the cross-section of said leaktight partition.

18. The insulating device of claim 16, wherein said at least one shaping template is a plurality of shaping templates disposed along said longitudinal axis of the case, two successive shaping templates being spaced apart by from about 20 m to about 50 m.

19. The insulating device of claim 16, wherein said leaktight partitions and said shaping templates hold at least two of said undersea pipes at a fixed distance apart.

20. The insulating device of claim 13, further comprising at least two centralizing templates located between said two successive leaktight transverse partitions along a longitudinal axis of said case, each said centralizing template being formed by a rigid part secured to said pipe and presenting a shape that allows limited displacement of said case in contraction and in expansion in register with said centralizing template, said container being disposed between two successive ones of said centralizing templates.

21. The insulating device of claim 20, wherein said centralizing template is formed by a rigid part, the centralizing template limiting deformation of said case by the case coming into mechanical abutment against said rigid part at at least two opposite points of the perimeter of the cross-section of said case, said displacement of the case being in register with said centralizing template representing variation of 0.1% to 10 of the distance between two opposite points of the perimeter of the cross-section of said case.

22. The insulating device of claim 20, wherein the positioning of said rigid piece that creates a space allowing the material constituting said insulating covering to be transferred through said centralizing template.

23. The insulating device of claim 1, wherein said case defines a perimeter presenting two axes of symmetry that are perpendicular to each other and to said longitudinal axis.

24. The insulating device of claim 23, wherein said cross-section of the case is circular.

25. The insulating device of claim 23, wherein said cross-section of the case is oval.

26. The insulating device of claim 23, wherein said cross-section of the case is rectangular.

27. The insulating device of claim 1 having at least two of said undersea pipes disposed in parallel.

28. The insulating device of claim 1, wherein the main insulating material substantially fills any space between said containers containing phase-change material and the flexible outer case.

* * * * *